Jan. 23, 1962 F. W. CUMMINGS ETAL 3,017,688
METHOD AND APPARATUS OF MAKING ELECTRICAL HEATING ELEMENTS
Filed Feb. 28, 1957 2 Sheets-Sheet 1
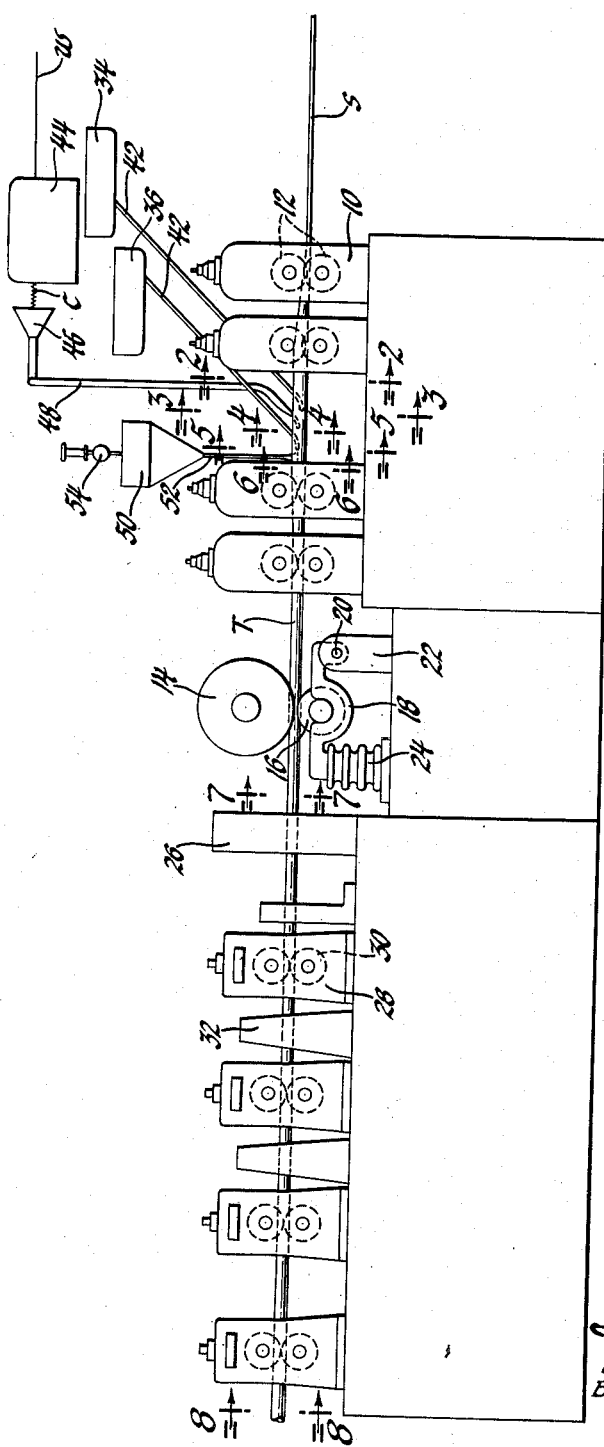
INVENTORS
Frederick W. Cummings &
Henry D. Mowers
BY
ATTORNEY Jan. 23, 1962   F. W. CUMMINGS ETAL   3,017,688
METHOD AND APPARATUS OF MAKING ELECTRICAL HEATING ELEMENTS
Filed Feb. 28, 1957   2 Sheets-Sheet 2

INVENTORS
Frederick W. Cummings &
Henry D. Mowers
BY R. P. Barnard
ATTORNEY

United States Patent Office 3,017,688
Patented Jan. 23, 1962

3,017,688
METHOD AND APPARATUS OF MAKING ELECTRICAL HEATING ELEMENTS
Frederick W. Cummings, Pittsford, and Henry D. Mowers, Spencerport, N.Y., assignors to General Motors Corporation, Detroit, Mich., a corporation of Delaware
Filed Feb. 28, 1957, Ser. No. 643,145
15 Claims. (Cl. 29—155.66)

The present invention relates to an apparatus and method for continuously making an electrical element. More particularly, the present invention relates to a method and apparatus for continuously manufacturing electrical heating elements comprising, an outer cylindrical steel tube encasing a coiled resistance element such as Nichrome which is radially spaced from the inner walls of the tube by a suitable insulating material.

According to the teaching of the present invention, the apparatus for manufacturing the aforedisclosed elements comprises a forming unit, a welding unit, and a sizing unit. The forming unit comprises a plurality of spaced pairs of forming rolls which are adapted to receive a continuous flat strip of steel stock to form it into substantially U-shaped cross section. Adjacent the forming unit there are two hoppers for insulating half-washers, each having a guide pipe for positioning the washers in the U-shaped portion of the metal stock between selected spaced pairs of the forming rolls. In addition, a spring winder is suitably controlled to provide a continuous length of axially coiled resistance wire, such as Nichrome, and to supply it through a guide pipe to the U-shaped metal stock between the washers. A funnel containing a suitable insulating material in powdered form and having a measuring and agitating device controls the flow of the insulating powder into the U-shaped metal section after the resistance element and washers have been placed therein so as to completely isolate the washer and wire assembly from the outer sheath formed by the U-shaped metal stock.

The welding unit may be of any suitable form as, for example, a pair of vertically spaced electrode rolls between which the metal tube may pass for welding after having been closed by passing through other spaced pairs of rolls of the forming unit.

The sizing unit includes a plurality of spaced pairs of vertically disposed sizing rolls between which the element enclosing tube is passed to effect staged reduction of its diameter. As the metal tube is reduced in diameter, it is caused to crush the washers positioned about the electrical heating element thereby forming with the powdered insulating material an insulating body completely surrounding and radially spacing the resistance element from the inner surface of the cylindrical metal tube.

When the tube is welded, a considerable bead is formed at the seam so that it is desirable, although not necessary, to pass it through a scarfing unit before entering the sizing unit. Such a scarfing unit includes a scraping or cutting tool to remove the excess bead formed at the tube seam during the welding operation.

It is, therefore, the primary object of this invention to provide an apparatus which will continuously manufacture electrical heating elements comprising an outer steel cylindrical sheath or tube enclosing a coiled resistance element completely surrounded by an insulated body which radially spaces it from the inner surface of the cylindrical steel sheath.

It is another object of this invention to continuously manufacture the aforedescribed heating element by a continuous method employing a flat strip of steel which is formed continuously into a cylindrical tube for encasing an insulated electrical heating element, the coiled heating element being continuously formed contemporaneously with the cylindrical tube from straight runs of wire such as Nichrome.

It is a principal feature of this invention to provide a method of continuously manufacturing electrical heating elements of the type described by continuously forming a flat strip of steel stock successively into U-shaped cross section and then cylindrical cross section, welding the seam between abutting edges of the tubular stock and reducing the diameter of the tube, while the heating element is continually fed into the U-shaped stock portion together with the upper and lower insulating half-washers and insulating powder to isolate the heating element from the surrounding tube.

These and other objects and features of this invention will appear more fully hereinafter as the description proceeds, reference being made therein to the accompanying drawings in which like numerals refer to like parts in the various views thereof, and in which:

FIGURE 1 is a side elevation of the apparatus for continuously manufacturing electrical heating elements;

FIGURES 2 through 8, inclusive, are cross sections taken on the corresponding lines indicated in FIGURE 1 to show the various stages of formation of the elements as the apparatus and method of this invention are employed;

Figure 6:
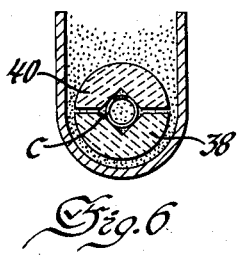

The specific apparatus shown in the drawing, insofar as the formation of the tube which carries the resistance wire is concerned, may be of substantially the same form as shown in the copending application of Hahn, S.N. 101,402, filed June 25, 1949, and the specific construction of this part of the apparatus forms no part of the present invention. This being true, the tube forming mill is not shown in its entirety and what is shown is illustrated only diagrammatically.

Figure 7:
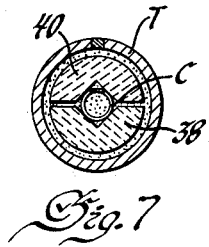
Figure 8:
Figure 9:
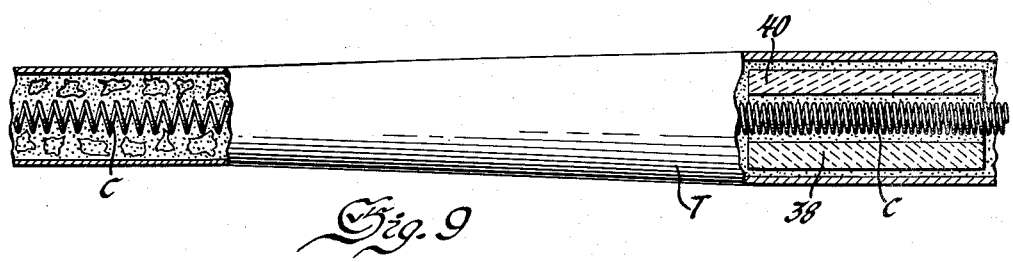
FIGURE 9 is a side view, partly in section, of the element showing the relationship of the parts thereof prior to and after the sizing operation.
Figure 10:
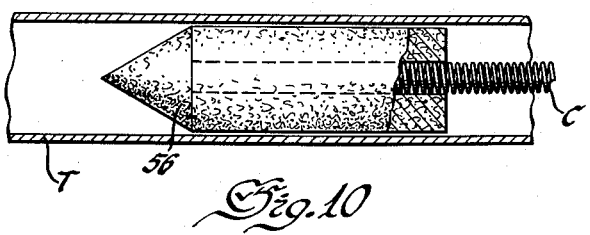
FIGURE 10 is a side elevation, partly broken away and in cross section, of a lead-in plug which may be used in initiating the continuous manufacture of the elements by the apparatus and method of this invention.

Referring to FIGURE 1 of the drawing, the tube mill comprises a series of forming devices 10, each of which has a pair of forming rolls 12 that progressively form a flat strip S of steel or other metal into a tube T, with the edges of the strip abutting at the top as indicated in FIGURE 7, as the strip S moves continuously through the forming mill from right to left. After the tube leaves the several forming devices, it passes through a welding apparatus which may be of the form shown in the patent to Nichols, 2,293,846, August 25, 1942, and comprises a pair of spaced electrode rolls 14, only one of which is shown. The tube passes the electrodes so that the abutting edges are in the space between the rolls and the tube is held against the electrodes by a pressure roller 16 rotatably supported by a lever 18, pivoted at 20 on standards 22 extending upwardly from the base of the machine. The left end of lever 18 is engaged by the upper end of a bellows 24, the lower end of which is supported on the base of the apparatus. Fluid, such as compressed air, may be supplied to the interior of the bellows to cause the roll 16 to exert whatever pressure is desired on the tube T. Obviously, other means, such as a spring, could be employed instead of the bellows 24.

When the tube is welded, a considerable bead is formed at the seam so that when the tube leaves the welder, it first passes through a scarfing unit, the construction of which is not shown, but is designated by the rectangle 26. The construction of this device is wholly immaterial with respect to the present invention, but it includes a scraping or cutting tool to remove the excess bead formed at the tube seam during the welding operation.

The tubing next passes through a plurality of sizing devices 28, each of which has a pair of sizing rolls 30 and between some of the sizing devices are forming devices 32 generally termed turks heads, which may have pairs of forming rolls or four forming rolls. By operating the sizing devices 28 at the proper speeds the tube T may be reduced to the exact diameter desired without any change in the wall thickness of the tube, or the wall of the tube may be made thicker or thinner as desired, simultaneously with the change in diameter. This sizing apparatus may be of the same construction and effects the same functions as the device disclosed in the copending application of Hahn et al., S.N. 410,986, filed February 17, 1954, and the specific construction of the sizing apparatus forms no part of the present invention.

After the strip S passes through two of the forming devices 10, it has the form indicated in section in FIGURE 2, being substantially U-shaped with a relatively wide opening at the top. Positioned above the forming unit, there are hoppers 34 and 36 containing, respectively, lower and upper half washers 38 and 40, formed of any suitable insulating material. Each hopper is connected by a guide pipe 42 to the U-shaped stock section at points spaced horizontally therealong between the second and third forming devices 10. A coil winder 44 is also mounted above the forming unit, preferably in close proximity to the hoppers, and continuously receives a length of wire W which it winds into a heating element coil C and supplies through a funnel 46 to a guide pipe 48 extending downwardly into the U-shaped portion of the metal stock between the hopper guide pipes. Positioned preferably over the U-shaped run of stock there is a funnel 50 which contains a powdered insulating material such as mica which is supplied to the U-shaped stock section at a point between the upper washer guide pipe 42 and the third forming device 10 by a suitable delivery pipe 52. A conventional measuring and agitating device 54 is preferably attached to the funnel 50 for controlling the supply of insulating powder to the U-shaped steel section.

The coil winder and measuring and agitating device for the powdered insulating material individually form no part of this invention and may be of any conventional form. It is only necessary to point out that the coil winder and insulating powder supply are so combined and arranged relative to the hoppers containing the insulating washers as to provide an apparatus which will continuously manufacture finished electrical heating elements of the type herein described.

It may be noted that each of the insulating half washers 38 and 40 have oppositely centrally disposed notches 55 which cooperate to form a substantially rectangular bore running through successive pairs of washers for receiving the heating element coil C.

In operation, and by utilizing the method of this invention, a finished electrical heating element may be manufactured by passing through spaced forming devices 10 a flat strip of steel stock S to thereby form it into substantially U-shaped cross section, depositing a lower insulating half washer 38 in the bottom of the U-shaped cross section through a guide pipe 42, seating the axially coiled resistance element C in the notch 55 formed in the washer, placing an upper insulating half washer 40 in substantially abutting engagement with the lower insulating washer and about the upper portion of the coiled resistance element, supplying powdered insulating material about the washers and between them and the inner surface of the U-shaped steel stock through delivery pipe 52, passing the U-shaped section through further forming devices to place the upper edges of the legs thereof in abutting relationship to form a tube T for subsequent welding by the electrode rolls 14, followed by passing the welded tube T through the sizing devices 28 to effect a reduction in diameter in the tube thereby causing crushing of the enclosed washer and a mixing thereof with the powdered insulating material to completely enclose the resistance element within the cylindrical steel tube.

Normally, to begin the continuous operation of this apparatus, the respective washers and coiled heating element must be manually guided until there is sufficient frictional engagement between the coiled element and the washers within the tube to automatically pull the coiled element along. Thus, at least after the sizing operation, the resistance element will be firmly locked within the tube to travel with the latter.

Rather than starting the operation by guiding the various parts manually, a lead-in plug 56 of fiber or other suitable material may have firmly engaged therein the leading end of coiled element C, the plug being seated within the formed tube T so as to frictionally engage the walls of the latter to pass through the welding electrode rolls.

We claim:

1. A method of forming electrical elements continuously from metal stock having substantially a U-shaped cross section comprising, continuously depositing a series of lower insulating half-washers in said stock, inserting a continuous run of coiled wire upon said washers, continuously depositing a series of upper insulating half-washers above said wire and lower washers, depositing a powdered insulating material about said washers and along the walls of said stock, bending the upstanding legs of said stock about said upper washers into substantially abutting engagement to form a tube substantially circular in cross section, and welding the edges of said tube.

2. A method of continuously manufacturing electrical heating elements comprising, passing a flat strip of steel stock through forming rolls to form said stock into substantially U-shaped cross section, depositing a series of lower insulating half washers within said U-shaped stock, depositing a continuous run of coiled electrical resistance wire upon said half washers, depositing a series of upper insulating half washers above said lower washers and about said heating element, whereby said washers radially space said coiled wire from said steel stock, depositing powdered insulating material between said stock and said insulating washers, passing said stock through forming rolls to bend the upstanding legs of said U-shaped section into substantially abutting engagement to form a tube substantially circular in cross section, passing said tube through welding rolls to weld the edges thereof, and passing said tube through sizing rolls to reduce its diameter thereby crushing such insulating washers for mixing with said powder to form a firmly packed insulating body between said tube and coiled wire.

3. A method of continuously manufacturing electrical heating elements comprising, passing a flat strip of steel stock through forming rolls to form said stock into substantially U-shaped cross section, depositing a series of lower insulating half-washers within said U-shaped stock, said washers having substantially aligned upwardly opening notches therein, inserting a continuous run of axially coiled electrical resistance wire within the notches of said lower washers, depositing a series of upper insulating half-washers above said lower washers and about said resistance wire, said upper washers having substantially aligned downwardly opening notches therein oppositely disposed from the notches of said lower insulating washers to form an opening through said washers to receive said coiled wire, whereby said washers radially space said coiled wire from said steel stock, depositing powered insulating material between said stock and said insulating washers, passing said stock through forming rolls to bend the upstanding legs of said U-shaped section into substantially abutting engagement to form a tube substantially circular in cross section, passing said tube through welding rolls to weld the abutting edges thereof, and passing said tube through sizing rolls to reduce its diameter thereby crushing said insulating washers for mixing with said powder to form a firmly packed insulating body between said tube and coiled wire.

4. A method of continuously manufacturing heating elements from a flat strip of steel stock comprising, passing said stock through forming rolls to form it into substantially U-shaped cross section, depositing a series of lower insulating half-washers in said U-shaped stock, passing a straight length of resistance wire through a coil winder to form said wire into a coiled resistance element, depositing said coiled resistance element on said washers within said U-shaped stock, depositing a series of upper insulating half-washers in abutting engagement with said lower washers so as to surround said coiled resistance element and radially space it from the walls of said steel stock, passing said U-shaped stock through forming rolls to bend the upstanding legs thereof into substantially abutting engagement to form a tube of substantially circular cross section, passing said tube through a welding apparatus to weld the edges thereof together, and passing said welded tube through sizing rolls to reduce the diameter thereof whereby said washers are crushed about said heating element.

5. A method of continuously manufacturing heating elements from a flat strip of steel stock comprising, passing said stock through forming rolls to form it into substantially U-shaped stock, depositing a series of lower insulating half-washers in said U-shaped cross section, passing a straight length of resistance wire through a coil winder to form said wire into a coiled resistance element, depositing said coiled resistance element on said washers within said U-shaped stock, depositing a series of upper insulating half-washers in abutting engagement with said lower washers so as to surround said coiled resistance element and radially space it from the walls of said steel stock, depositing powdered insulating material between said stock and said insulating washers, passing said U-shaped stock through forming rolls to bend the upstanding legs thereof into substantially abutting engagement to form a tube of substantially circular cross section, passing said tube through a welding apparatus to weld said edges together, and passing said welded tube through sizing rolls to reduce the diameter thereof whereby said washers are crushed about said heating element and mingled with said powder.

6. A method of continuously manufacturing heating elements from a flat strip of steel stock comprising, passing said stock through forming rolls to form it into substantially U-shaped cross section, depositing a series of lower insulating half-washers in said U-shaped stock, said washers having substantially aligned upwardly opening notches therein, passing a straight length of resistance wire through a coil winder to form said wire into a coiled resistance element, inserting said coiled resistance element into the notches of said lower insulating washers, depositing a series of upper insulating half-washers in abutting engagement with said lower washers so as to surround said coiled heating element and radially space it from the walls of said steel stock, said upper washers having substantially aligned downwardly opening notches therein oppositely disposed to the notches in said lower washers to form an opening through said washers through which said coiled resistance element extends, passing said U-shaped stock through forming rolls to place the upstanding legs thereof in substantially abutting engagement to form a tube of substantially circular cross section, passing said tube through welding rolls to weld the edges thereof together, and passing said cylindrical tube through sizing rolls to reduce the diameter thereof whereby said washers are crushed about said heating element.

7. A method of continuously manufacturing heating elements from a flat strip of steel stock comprising, passing said stock through forming rolls to form it into substantially U-shaped cross section, depositing a series of lower insulating half washers in said U-shaped stock, said washers having substantially aligned upwardly opening notches therein, passing a straight length of resistance wire through a coil winder to form said wire into a coiled resistance element, inserting said coiled resistance element into the notches of said lower insulating washers, depositing a series of upper insulating half-washers in abutting engagement with said lower washers so as to surround said coiled heating element and radially space it from the walls of said steel stock, said upper washers having substantially aligned downwardly opening notches therein oppositely disposed to the notches in said lower washers to form an opening through said washers through which said coiled resistance element extends, depositing powdered insulating material about said insulating washers, passing said U-shaped stock through forming rolls to place the upstanding legs thereof in substantially abutting engagement to form a tube of substantially circular cross section, passing said tube through welding rolls to weld the edges thereof together, and passing said tube through sizing rolls to reduce the diameter thereof whereby said washers are crushed about said heating element and mingled with said powder.

8. An apparatus for continuously manufacturing electrical heating elements comprising, a forming unit, a welding unit and a sizing unit, said units including pairs of vertically spaced rollers between which a run of steel stock continuously progresses; said forming unit comprising, a plurality of pairs of forming rolls adapted to receive therebetween a flat strip of steel stock and to form therefrom, successively, a run of stock having a substantially U-shaped cross section and from which a run of tubular stock is formed, a hopper containing lower insulating half-washers mounted above said forming rolls, a guide pipe for said washers extending downwardly from said hopper to said U-shaped stock whereby lower insulating washers may be continuously deposited within said stock, an element guide pipe extending downwardly into said U-shaped stock at a point along the run of said stock behind said lower washer guide pipe, means for continuously feeding a coiled resistance element into said guide pipe whereby said coiled element is deposited along adjacent lower insulating washers, a hopper mounted above said forming rolls and containing upper insulating half-washers, a guide pipe for said washers extending downwardly from said hopper to said U-shaped stock at a point behind said element guide pipe whereby upper insulating half-washers are continuously deposited over said lower insulating washers and about said coiled element to radially space the latter from said stock; said welding unit including vertically spaced electrode rolls between which said tubular stock passes to weld together the edges thereof; said sizing unit comprising a plurality of pairs of vertically spaced rolls between which said tubular stock continuously passes to reduce the diameter thereof, whereby said insulating washers are crushed to form an insulating body completely surrounding said coiled heating element and radially spacing it from the inner wall of said tube.

9. An apparatus for continuously manufacturing electrical heating elements comprising, a forming unit, a welding unit and a sizing unit, said units including pairs of vertically spaced rollers between which a run of steel stock continuously progresses; said forming unit comprising, a plurality of pairs of forming rolls adapted to receive therebetween a flat strip of steel stock and to form therefrom, successively, a run of stock having a substantially U-shaped cross section and from which a run of tubular stock is formed, a hopper containing lower insulating half-washers mounted above said forming rolls, a guide pipe through which said insulating washers may be deposited continuously within said stock extending downwardly from said hopper into said U-shaped run of stock, a coil winder mounted above said forming rolls and adapted to receive continuously a straight length of resistance wire to automatically coil the latter into a resistance element, a guide pipe extending downwardly into said U-shaped stock at a point along the run of said stock behind said lower washer guide pipe, said coil winder feeding said coiled element into said guide pipe whereby said coiled element is deposited along adjacent lower insulating washers, a hopper mounted above said forming rolls and containing upper insulating half-washers, a guide pipe for said washers extending downwardly from said hopper to said U-shaped stock at a point behind said element guide pipe whereby upper insulating half-washers are continuously deposited over said lower insulating washers and about said coiled element to radially space the latter from said stock; said welding unit including vertically spaced electrode rolls between which said tubular stock passes to weld together the edges thereof; said sizing unit comprising a plurality of pairs of vertically spaced rolls between which said tubular stock continuously passes to reduce the diameter thereof, whereby said insulating washers are crushed to form an insulating body completely surrounding said coiled heating element and radially spacing it from the inner wall of said tube.

10. An apparatus for continuously manufacturing electrical heating elements comprising, a forming unit, a welding unit and a sizing unit, said units including pairs of vertically spaced rollers between which a run of steel stock continuously progresses; said forming unit comprising, a plurality of pairs of forming rolls adapted to receive therebetween a flat strip of steel stock and to form therefrom, successively, a run of stock having a substantially U-shaped cross section and from which a run of tubular stock is formed, a hopper containing lower insulating half-washers mounted above said forming rolls, a guide pipe through which said insulating washers may be deposited continuously within said stock extending downwardly from said hopper into said U-shaped run of stock, a resistance element guide pipe extending downwardly into said U-shaped stock at a point along the run of said stock behind said lower washer guide pipe, means for continuously feeding a coiled resistance element into said guide pipe whereby said coiled element is deposited along adjacent lower insulating washers, a hopper mounted above said forming rolls and containing upper insulating half-washers, a guide pipe for said washers extending downwardly from said hopper to said U-shaped stock at a point behind said element guide pipe whereby upper insulating half-washers are continuously deposited over said lower insulating washers and about said coiled element to radially space the latter from said stock, a bin of powdered insulating material mounted above said forming rolls, a guide pipe extending downwardly from said hopper into said U-shaped stock at a point behind said upper washer guide pipe whereby powdered insulating material is continuously deposited about said insulating washers and heating element enclosed thereby, said welding unit including vertically spaced electrode rolls between which said tubular stock passes to weld together the edges thereof; said sizing unit comprising a plurality of pairs of vertically spaced rolls between which said tubular stock continuously passes to reduce the diameter thereof; whereby said insulating washers are crushed and mingle with said insulating powder to form an insulating body completely surrounding said coiled heating element and radially spacing it from the inner wall of said tube.

11. An apparatus for continuously manufacturing electrical heating elements comprising, a forming unit, a welding unit and a sizing unit, said units including pairs of vertically spaced rollers between which a run of steel stock continuously progresses; said forming unit comprising, a plurality of pairs of forming rolls adapted to receive therebetween a flat strip of steel stock and to form therefrom, successively, a run of stock having a substantially U-shaped cross section and from which a run of tubular stock is formed, a hopper containing lower insulating half-washers mounted above said forming rolls, a guide pipe through which said insulating washers may be deposited continuously within said stock extending downwardly from said hopper into said U-shaped run of stock, a coil winder mounted above said forming rolls and adapted to receive continuously a straight length of resistance wire to automatically coil the latter into a resistance element, a guide pipe extending downwardly into said U-shaped stock at a point along the run of said stock behind said lower washer guide pipe, said coil winder feeding said coiled element into said guide pipe whereby said coiled element is deposited along adjacent lower insulating washers, a hopper mounted above said forming rolls and containing upper insulating half-washers, a guide pipe for said washers extending downwardly from said hopper to said U-shaped stock at a point behind said element guide pipe whereby upper insulating half-washers are continuously deposited over said lower insulating washers and about said coiled element to radially space the latter from said stock, a bin of powdered insulating material mounted above said forming rolls, a guide pipe extending downwardly from said hopper into said U-shaped stock at a point behind said upper washer guide pipe whereby powdered insulating material is continuously deposited about said insulating washers and heating element enclosed thereby, said welding unit including vertically spaced electrode rolls between which said tubular stock passes to weld together the edges thereof; said sizing unit comprising a plurality of pairs of vertically spaced rollers between which said tubular stock continuously passes to reduce the diameter thereof, whereby said insulating washers are crushed and mingle with said insulating powder to form an insulating body completely surrounding said coiled heating element and radially spacing it from the inner wall of said tube.

12. An apparatus for continuously manufacturing electrical heating elements comprising, a forming unit, a welding unit and a sizing unit, said units including pairs of vertically spaced rollers between which a run of steel stock continuously progresses; said forming unit comprising, a plurality of pairs of forming rolls adapted to receive therebetween a flat strip of steel stock and to form therefrom, successively, a run of stock having a substantially U-shaped cross section and from which a run of tubular stock is formed, a hopper containing lower insulating half-washers mounted above said forming rolls, a guide pipe through which said insulating washers may be deposited continuously within said stock extending downwardly from said hopper into said U-shaped run of stock, a coil winder mounted above said forming rolls and adapted to receive continuously a straight length of resistance wire to automatically coil the latter into a resistance element, a guide pipe extending downwardly into said U-shaped stock at a point along the run of said stock behind said lower washer guide pipe, said coil winder feeding said coiled element into said guide pipe whereby said coiled element is deposited along adjacent lower insulating washers, a hopper mounted above said forming rolls and containing upper insulating half-washers, a guide pipe for said washers extending downwardly from said hopper to said U-shaped stock at a point behind said element guide pipe whereby upper insulating half-washers are continuously deposited over said lower insulating washers and about said coiled element to radially space the latter from said stock, a bin of powdered insulating material mounted above said forming rolls, a guide pipe extending downwardly from said hopper into said U-shaped stock at a point behind said upper washer guide pipe whereby powdered insulating material is continuously deposited about said insulating washer and heating element enclosed thereby, means for agitating and measuring the flow of said powdered insulating material; said welding unit including vertically spaced electrode rolls between which said tubular stock passes to weld together the edges thereof; said sizing unit comprising a plurality of pairs of vertically spaced rollers between which said tubular stock continuously passes to reduce the diameter thereof, whereby said insulating washers are crushed and mingle with said insulating powder to form an insulating body completely surrounding said coiled heating element and radially spacing it from the inner wall of said tube.

13. An apparatus for continuously manufacturing electrical heating elements comprising, a forming unit, a welding unit and a sizing unit, said units including pairs of spaced rollers between which a run of metal stock continuously progresses, said forming unit comprising a plurality of pairs of forming rolls adapted to receive therebetween a strip of metal stock and to form therefrom, successively, a run of stock having a substantially U-shaped cross section and from which a run of tubing is formed, a hopper containing lower insulating half-washers mounted above said forming rolls, a guide for washers extending downwardly from said hopper to said U-shaped stock whereby lower insulating washers may be continuously deposited within said stock, an element guide extending downwardly into said U-shaped stock at a point along the run of said stock behind said lower washer guide, means for continuously feeding a resistance element into said element guide whereby said element is deposited along adjacent lower insulating washers, a second hopper mounted above said forming rolls and containing upper insulating half-washers, a guide for said washers extending downwardly from said hopper to said U-shaped stock at a point behind said element guide whereby upper insulating half-washers are continuously deposited over said lower insulating washers and about said element to radially space the latter from said stock; said welding unit including electrode rolls between which the tubular run of stock passes to weld together the edges thereof; said sizing unit comprising a plurality of pairs of spaced rolls between which said tubular stock continuously passes to reduce the diameter thereof, whereby said insulating washers are crushed to form an insulating body completely surrounding said heating element and radially space it from the inner wall of said tube.

14. A method of forming electrical elements continuously from metal stock having substantially a U-shaped cross section comprising, continuously depositing a series of lower insulating half-washers in said stock, inserting a continuous run of coiled wire upon said washers, continuously depositing a series of upper insulating half-washers above said wire and lower washers, depositing a powdered insulating material about said washers and along the walls of said stock, bending the upstanding legs of said stock about said upper washers into substantially abutting engagement to form a tube substantially circular in cross section, welding the edges of said tube, and passing said tube through sizing rolls to reduce its diameter thereby crushing said insulating washers to form a firmly packed insulating body between said tube and coiled wire.

15. The method as defined in claim 14 in which the initial run of coiled wire is imbedded in a resilient plug deposited in said U-shaped stock, whereby said plug is firmly engaged by said stock after the latter is passed through said rolls to form a tube of substantially circular cross section so that the following run of said coiled wire is pulled along with said stock.

References Cited in the file of this patent

UNITED STATES PATENTS

| | | |
|---|---|---|
| 1,997,844 | Wiegand | Apr. 16, 1935 |
| 2,088,446 | Specht | July 27, 1937 |
| 2,515,487 | Bertalan | July 18, 1950 |
| 2,525,300 | Jones | Oct. 10, 1950 |
| 2,568,846 | Cox | Sept. 25, 1951 |
| 2,677,172 | Oakley | May 4, 1954 |
| 2,771,669 | Armstrong et al. | Nov. 27, 1956 |
| 2,808,492 | Yohe | Oct. 1, 1957 |
| 2,841,201 | Cheatle | July 1, 1958 |

FOREIGN PATENTS

| | | |
|---|---|---|
| 104,600 | Australia | July 28, 1939 |
| 768,934 | France | Aug. 16, 1934 |

OTHER REFERENCES

Tomlinson and Wright, Journal of the Institute of Electrical Engineers, August 1946, vol. 93, Part II, No. 34, pp. 327–328.

UNITED STATES PATENT OFFICE
CERTIFICATE OF CORRECTION

Patent No. 3,017,688                                        January 23, 1962

Frederick W. Cummings et al.

It is hereby certified that error appears in the above numbered patent requiring correction and that the said Letters Patent should read as corrected below.

Column 4, line 71, for "powered" read -- powdered --; column 10, line 38, for "July 28, 1939" read -- July 28, 1938 --.

Signed and sealed this 8th day of May 1962.

(SEAL)
Attest:

ERNEST W. SWIDER
Attesting Officer

DAVID L. LADD
Commissioner of Patents